United States Patent [19]
Cassou et al.

[11] Patent Number: 5,160,940
[45] Date of Patent: Nov. 3, 1992

[54] INK-JET PRINTING DEVICE FOR STRAWS TO CONTAIN BIOLOGICAL FLUIDS

[76] Inventors: Robert Cassou, "Les Camus", Sainte Montaine 18700 Aubigny-sur-Nere; Maurice Cassou, 10 Rue Clémenceau; Bertrand Cassou, 10 Rue Georges Clémenceau, both of 61300 L'Aigle, all of France

[21] Appl. No.: 625,099

[22] Filed: Dec. 10, 1990

[30] Foreign Application Priority Data

Dec. 11, 1989 [FR] France .................. 89 16341

[51] Int. Cl.⁵ .............. G01D 15/16; B41F 17/00; B65G 15/44; B65H 5/00
[52] U.S. Cl. .................. 346/75; 346/140 R; 101/35; 101/36; 101/37; 198/468.8; 198/689.1; 198/785; 221/233
[58] Field of Search ............ 346/75, 140 R; 198/454, 198/455, 468.8, 689.1, 785; 101/35, 36, 37; 221/233

[56] References Cited

U.S. PATENT DOCUMENTS

| | | | |
|---|---|---|---|
| 4,063,633 | 12/1977 | Hall | 198/455 |
| 4,503,437 | 3/1985 | Katzschner | 346/75 |
| 4,557,191 | 12/1985 | Speicher | 101/35 |
| 4,757,382 | 7/1988 | Kazivra et al. | 198/689.1 |
| 4,790,451 | 12/1988 | Cassou et al. | 221/233 |

FOREIGN PATENT DOCUMENTS 2593482 1/1986 France .
0234978 1/1987 France .

Primary Examiner—Benjamin R. Fuller
Assistant Examiner—Gerald E. Preston
Attorney, Agent, or Firm—Perry Carvellas

[57] ABSTRACT

An ink jet printing machine for elongate cylindrical articles such as tubes or straws for biological fluids, includes an automatically controlled ink-jet printing station. The printing station includes a printing head, handling apparatus for the straws or tubes comprising an admission passage for receiving, guiding and feeding straws or tubes, a wall panel, a suction port disposed in the wall panel at a downstream end of the admission passage and connected to a source of vacuum, a transfer plunger mounted for reciprocating along the wall panel between the suction port and a conveyor, the leading straw or tubes being transferred from the suction port to the conveyor by displacement of the transfer plunger toward the conveyor.

32 Claims, 3 Drawing Sheets

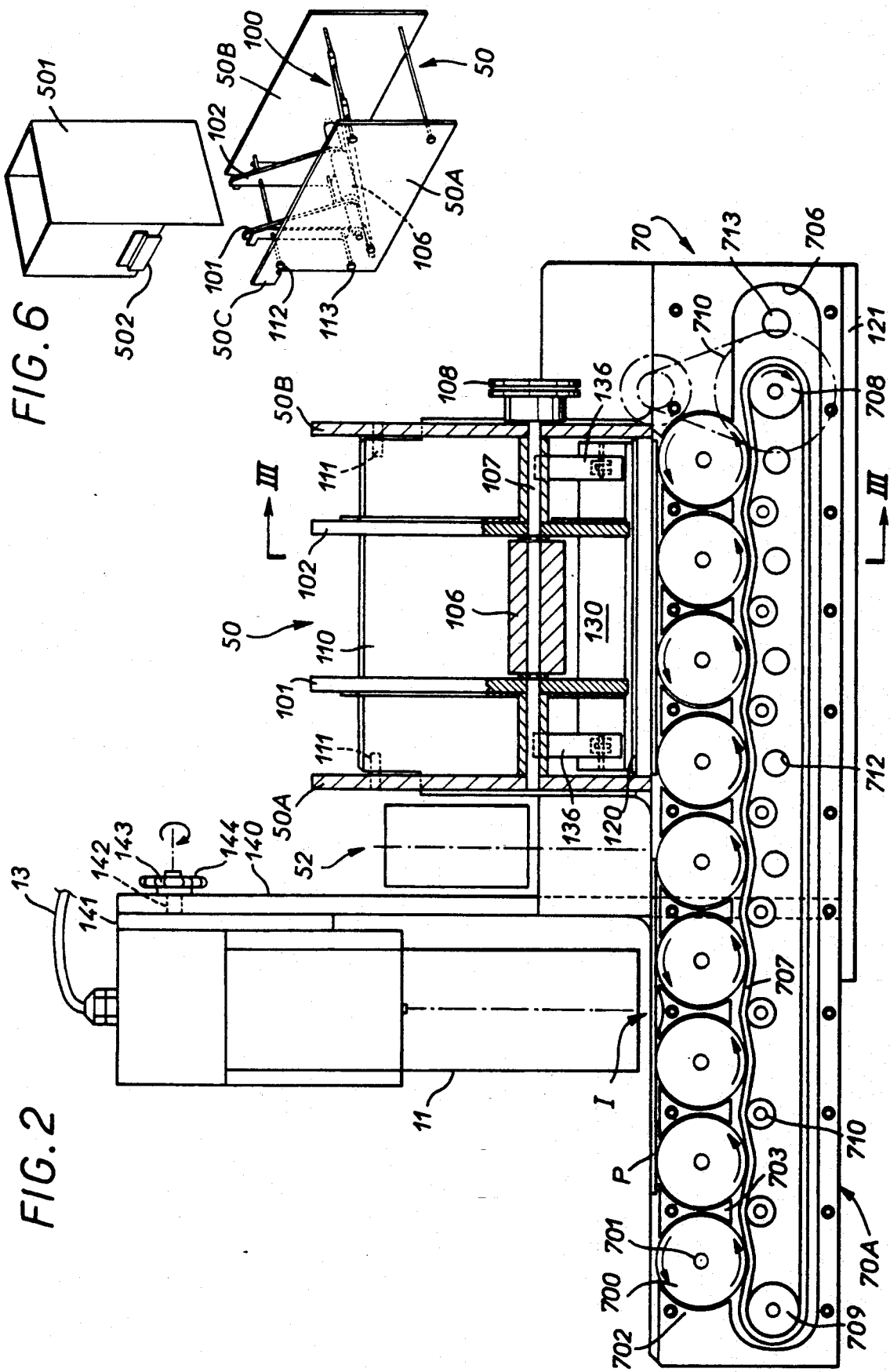

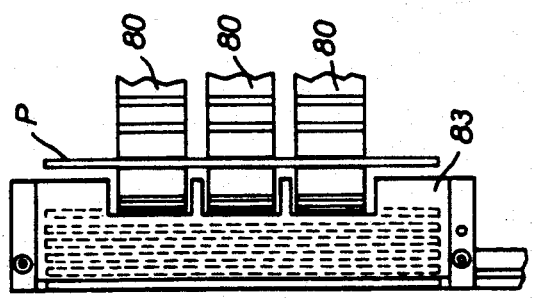
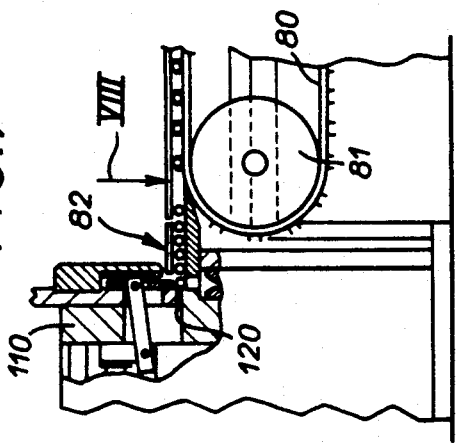
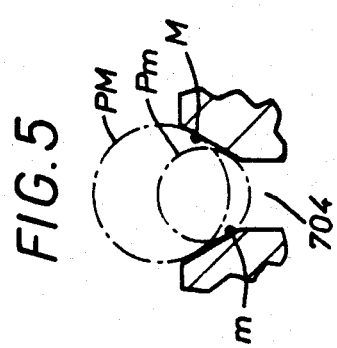
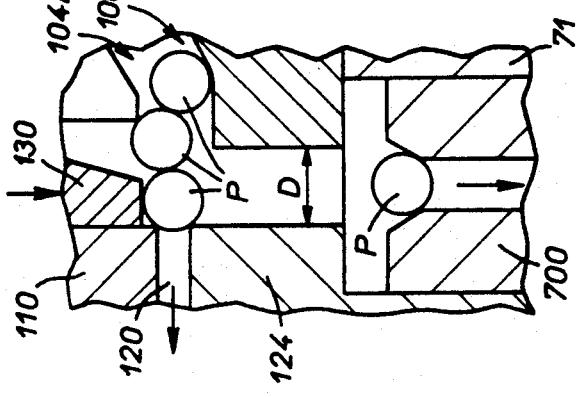
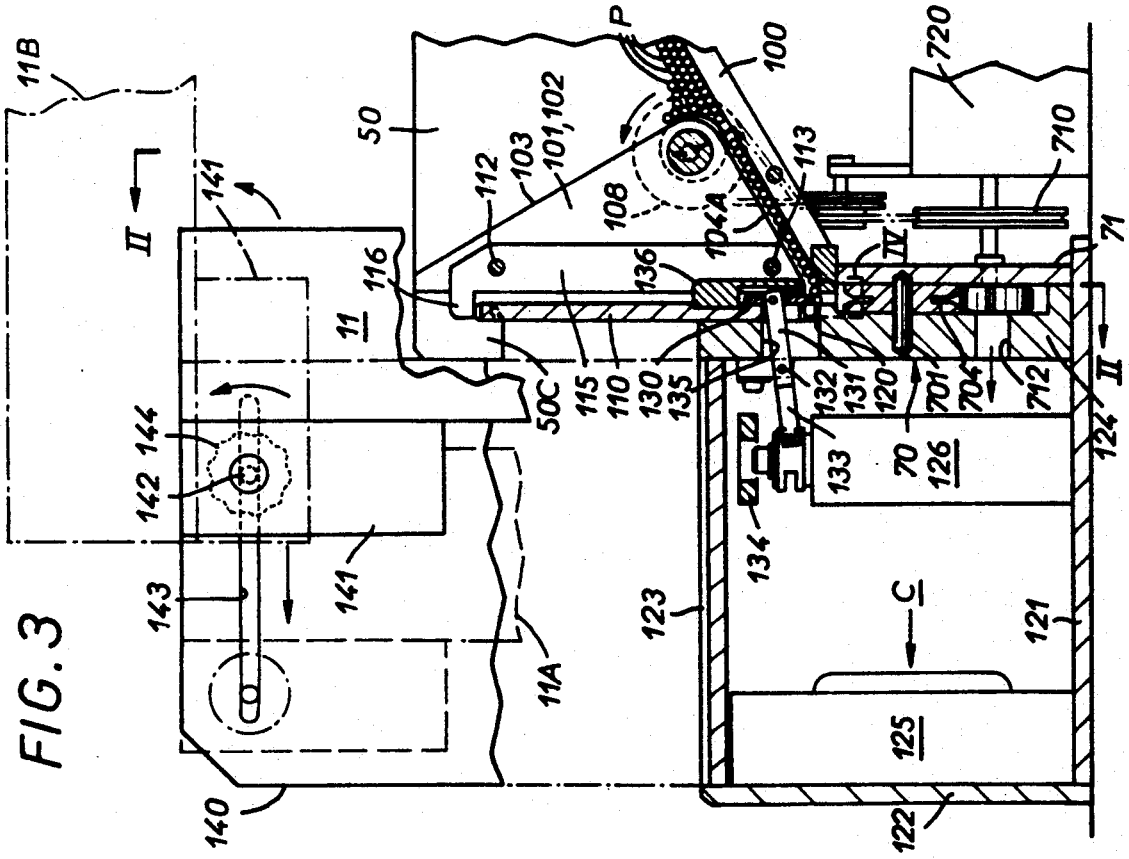

INK-JET PRINTING DEVICE FOR STRAWS TO CONTAIN BIOLOGICAL FLUIDS

The present invention relates to an ink-jet printing device for cylindrical straws to contain biological fluids of the kind described, notably, by the Applicants in their European patent EP Appln. 87 400106 of Jan. 16, 1987.

The prior apparatus comprised, in combination with an ink-jet printing machine, a loading hopper with means for guiding towards a distribution passage, a unit pick-up member and a member for longitudinally conveying the successive straws to a printing head on the machine.

While giving satisfaction with regard to their general conditions of operation, these prior apparatus are subject to limitations on their performance and on their suitability for automation of their operation, particularly with modern printing machines designed to be computer controlled and to operate at considerable printing speeds, in the order of 500 characters per second for example.

The need has thus been felt for an improvement in the performance of the straw loading, unit pick-up and longitudinal conveying, and one particular object of the present invention is to achieve this by cutting down, and even eliminating certain mechanical means previously implemented to control the different movements of the straws. Generally speaking, it does, indeed, appear difficult to contemplate reducing the number of mechanical members (stops forming slides, contact rollers performing a to and fro' movement, control levers and cams, etc.) within limits compatible with the lightness of the straws to be manipulated and with the operating rates that can be envisaged taking in isolation the performances of the printing machines and the automatic operations that may be associated therewith.

The chief means proposed in this connection by the present invention essentially resides in an action practically free of inertia which is made possible, in the handling of the straws, through the effect of a suitably arranged negative pressure, whether it be with a view to the unit pick-up of the straws delivered in succession, via a distribution passage, or to ensure that the successive straws are rendered integral, by simple adherence, with a train of propelling rollers capable of being imparted a considerable speed of propulsion.

This general means makes it possible, according to one aspect of the invention, to combine with an ink-jet printing machine, controlled by an automaton, possibly associated with a specially allocated computer, a straw distributor of the type under consideration, this combination being notably characterized by the arrangement, at the end of a straw admission passage, of a front panel with a suction slot connected up to a negative pressure source and of an individual pick-up pallet to which is imparted a to and fro sweeping movement over the said panel.

Thanks to this arrangement, each incident straw being immobilized by a means practically free of inertia, which is the suction effect exerted at the entry of the suction slot, the pick-up of the straw thus immobilized by a practically instantaneous action can be ensured by a simple sweeping of the front panel by means of a pallet that is extremely light and capable of being driven with very little energy to perform an alternating movement at a very fast rate.

Complementarily, and according to another aspect of the invention, longitudinal propulsion of the straws thus successively delivered on the longitudinal conveying member is ensured by means of a train of grooved rollers, associated, in turn, with a depression source so that, here again, it is a suction effect which provides, practically without inertia, the adherence required for faultlessly driving the straws on a train of propelling rollers capable of being driven at considerable tangential speeds.

It thus becomes possible to obtain, in combination with an automaton and computer controlled ultra high speed printer, a distributor capable of working at considerable rates, in the order of 20,000 straws per hour, for example, thus taking advantage of the potential offered by the most up-to-date data processing means with regard to the efficiency, management and security of the installations concerned.

The characteristics and advantages of the invention will emerge, moreover, from the following description, given by way of example, with reference to the annexed drawings, wherein:

FIG. 2 is an elevation view of the distributor in partial cross-section, in the plane II—II of FIG. 3, the cover of the drive box being removed;

FIG. 3 is a side elevation view of the distributor, in partial cross-section, in planes III—III of FIG. 2;

FIG. 4 is a larger scale view of area IV in FIG. 3;

FIG. 5 is an even larger scale view of the profile of a propelling roller groove;

FIG. 6 is a perspective view of the loading hopper;

FIG. 7 is a side elevation view of a variant in which the distributor is supplied by the output of a straw filling machine;

FIG. 8 is a plan view corresponding to FIG. 7.

Figure 1:
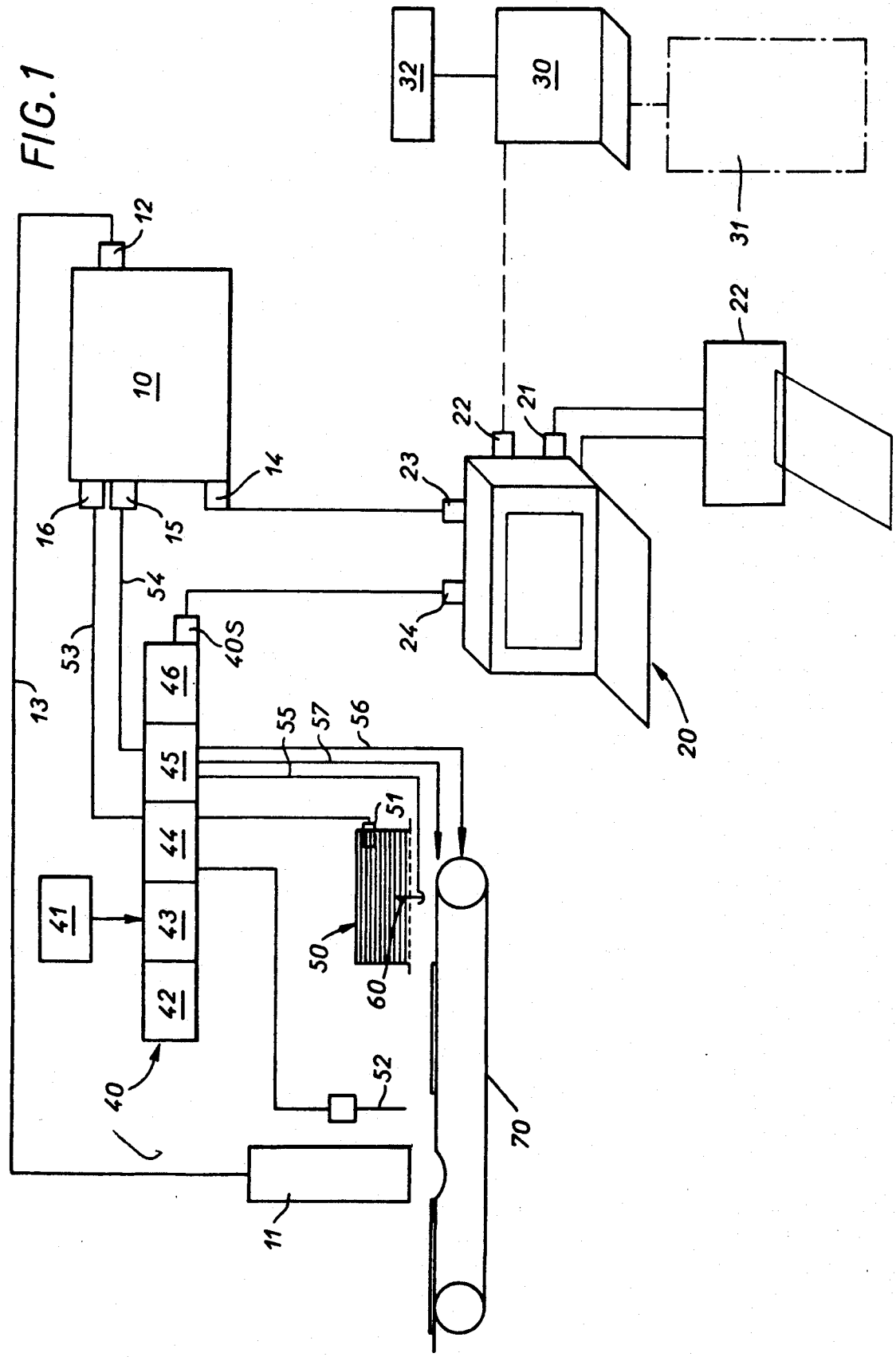
FIG. 1 is an overall diagram of a distributor according to the invention controlled by automaton with an allocated computer linked up to a central computer.

According to the form of embodiment chosen and represented, the invention is applied to an installation equipped with a printing machine designated by reference number 10, here, one of the DOMINO AMJET type having 64 ASCII characters and a 7×5 dot matrix. It comprises a printing head 11 connected to an output 12 by a cable 13, while three data inputs, 14,15,16, are provided. Input 14 is connected to a micro computer 20 allocated to the installation, itself connected, if necessary, to a central computer 30 of the establishment concerned, such as an artificial insemination centre with a data bank, schematically represented at 31 and specific instruments, such as, for example, a spectrophotometer, indicated at 32, serving to monitor the dilution of an ejaculate and to determine the number of straws of a given type to be produced with the sample. The central computer will thus generally ensure the management of the centre as a whole, of the stocks of straws, and of the different items of information regarding the obtaining and use thereof.

Computer 20 allocated to the printing installation will, for its part, have the task of managing the execution of the straw printing operations, including, as applicable, the control, via an output 21 provided for this purpose, of a dot matrix paper printer 22 for the recording and daily summarizing of the information relating to the processed and printed straws.

Here, the allocated computer, 20, is of the PC 16/16 type, adapted to manage an automaton 40, here, a SIEMENS SIMATIC S5-100U controlled by a so-called operator console 41, OP 393. Automaton 40 comprises essentially a power unit 42, a central processing unit 43, an input module 44, an output module 45 and a module 46, constituting an interface linking up with computer 20.

Communication between computers, printers and the automaton takes place conventionally via serial ports such as those indicated at 21 to 24 on computer 20, at 14 on printer 10 and at 40S on the automaton.

The operator console 41 plays the part, in respect of automaton 40, of a programming console. As it is connected to central unit 43 by a flexible cord, it can be hand held as with a pocket calculator and can be used, on one hand, for setting timers and counters, and, on the other hand, for displaying texts to be printed by means of an alphanumeric keyboard with two lines of 16 characters. The message thus composed, which is stored in central unit 43, can comprise, in the case of the example under consideration, up to 82 characters and spaces as a function of the characteristics of the printing head and of the room available depending on the length of the straws, which is generally fixed at 133 mm.

The so-called input, 44, and output, 45, modules of the automaton are, finally, allocated to the control and command members of the printing distributor properly speaking, which will be described in detail below in respect of its different parts essentially comprising straw introducing means 50, individual pick-up means 60 and propelling and ejection conveyor 70.

Input module 44 receives the signals delivered by two sensors 51,52 respectively designed to monitor the presence of straws in the vicinity of the introducing means 50, on one hand, and, immediately upstream of printing head 11, on the other hand. Its function is to send a fault signal to terminal 16 of printer 10 via line 53. For its part, a terminal 15 of the printer, under normal conditions, sends a printing signal via line 54 to module 45, referred to as the output module of the automaton, which is adapted to supply, via lines 55, 56, 57, the pick-up and propulsion means to be considered now with reference to the following figures.

According to the form of embodiment of FIGS. 2 to 4, the straw introducing means are of the feed hopper type permitting the horizontal loading of straws P between two parallel flanges 50A, 50B, above a bottom 100 and opposite a pair of deflectors, 101, 102 having the shape of ski spatulas with an abutment face 103 substantially perpendicular to bottom 100 and a face 104A parallel to the said bottom and spaced therefrom by a distance slightly greater than the diameter of the straws to be received; there is thus determined between the inclined bottom 100 and faces 104B of spatulas 101, 102, a guide passage enabling the straws to be gravity fed towards a front panel 110.

The receiving and guiding device thus formed is completed by an eccentric roller 106 carried between deflectors 101, 102 by a pin 107 which bears, on one of the lateral sides of hopper 50, a pulley 108 adapted to receive a belt for rotation counter to the direction of travel of the straws in transverse translation in distribution passage 104. This precludes any risk of distribution congestion by pushing back upwards at each rotation those straws that tend to accumulate at the entry to the passage.

The loading hopper thus formed is a light structure that is easily interchangeable, having, for example, the shape illustrated in FIG. 6; the two flanges, 50A, 50B, each having a lug-hook 50C adapted to fit by hooking onto teats provided for this purpose on either side of the upper portion of front panel 110 of the distributor. Deflectors 101, 102 are, for their part, assembled with flanges 50A, 50B by means of spacer rods 112,113, each of the deflectors 101, 102 being doubled in this assembly by a reinforcing plate 115 having a lug 116 for bearing on the upper edge of front panel 110.

A feed hopper 50 will, in principle, be provided for each straw diameter, this diameter determining, as we have seen, the transverse dimension of guide channel 104B. In any case, and according to one aspect of the present invention, the guide channel must emerge opposite a so-called suction slot 120 provided for this purpose at the bottom of front panel 110 and at a certain distance D (FIG. 4) from front wall 124.

Before proceeding to a detailed description of the distributor, it will be further noted with reference to FIG. 6 that there is a possibility of associating with load hopper 50 a loading guide 501; the latter takes the form of a bottomless box capable of fitting, by means of lugs 502, over the upper edges of the two flanges 50A, 50B, thus forming a vertical guide passage such as to facilitate the loading into the hopper of a packet of straws. Such a packet can be placed in a tearable packing bearing an identification of its contents; this identification is advantageously provided by a bar code labelling suitable for cooperating with a bar code reader provided for this purpose in an optical monitoring area of the distributor.

In the form of embodiment illustrated in FIGS. 2 and 3, this distributor comprises, above a base 121, a caisson C having a generally parallelepipedic shape delimited (see FIG. 3) by a rear wall 122, an upper wall 123 and a front wall 124, and serving to house a motor-fan 125, as well as an electromagnet 126 having a vertical axis.

The aforementioned front panel 110 surmounts the front wall 124 of the caisson and overlies an upper portion thereof, defining therein suction slot 120 above and opposite which a pick-up pallet 130 is adapted to perform a to and fro movement.

This pick-up pallet is adapted to slide to and fro in contact with the front face of front panel 110, being articulated for this purpose at the ends of a control yoke with two arms 131, which is mounted so as to rotate freely on a pin 132 and coupled by a lever 133 to the moving armature of the electromagnetic 126. This armature is biased towards an upper position in contact with a stop 134 by a return spring (not shown) and drawn into bottom position when the coil of the electromagnetic is energized.

Each of the arms of the control yoke 131 passes through a slot 135 provided for this purpose in wall 124 and in the front panel, and a guide strip element 136 is provided on the front panel opposite each coupling of control fork 131.

The pick-up operation thus comprises, according to one aspect of the present invention, after the immobilization by suction of each incident straw P against the suction slot 120 (FIG. 4), the discharge of this straw by the lowering of pick-up pallet 130 onto propulsion device 70, which will now be described.

The propulsion device 70 according to the invention is designed in the general shape of a flat, elongated parallelepipedic box on the front of the caisson and protruding laterally to the left of the caisson as viewed from the front. In the elevation view in FIG. 2, the caisson properly speaking is bounded to the left by a lateral panel 140 which serves to support the printing head 11 and which delimits between itself and front panel 110 an area 52 and housing the optical monitoring means. It can thus be seen that the box 70 comprises a terminal portion 70A extending, in cantilever fashion, beyond the caisson with which it shares wall 124 (FIG. 3).

This wall 124 which borders the caisson at the front constitutes the main body of box 70 with the shape that can be seen in FIG. 2, in which cover 71 designed to close the box at the front has been removed. This wall thus appears as a complex element that can be moulded and/or machined and housing in its upper portion a row of rollers 700 mounted so as to rotate freely on pins 701, each of these rollers being surrounded over approximately one quarter of its periphery by a peripheral confining wall such as 702 at the end of the row and by a double-concave separating piece 703 between two adjacent rollers.

As can be seen from FIGS. 3 to 5, each roller has a deep groove extending radially over a considerable portion of the radius, this groove having on its running portion a width of less than the smallest diameter of the straws to be processed (Pm) and, at the entry, a profile flaring to attain a width slightly smaller than the maximum diameter of the straws to be manipulated (PM).

The lower portion of box 124 provides an elongated passage 706 serving to house a drive belt 707 extending between a motive pulley 708 and an idle pulley 709 and passing over a series of tension rollers placed between successive rollers 700. The motive pulley is integral with a drive pulley 710 coupled by belt 711 to a motor 720 from the shaft of which is also taken the movement transmitted by belt to pulley 108 of the feed hopper.

Finally, box 70 has, in its rear wall, a series of holes 712 for communication with the inner space of caisson C, one such hole being placed vertically below each of the axes 701 located in the area of the caisson and one such additional hole 713 being further provided beyond (to the right of) the axis of pulley 708.

All these holes 712 and 713 emerge on the inside of the caisson C: as a result, when fan 125 is in operation, the air being pumped through these different holes (at the same time as through the suction slot 120), a negative pressure is set up in the input acessible through the top of the flared groove of each of rollers 700, so that any straw, once it has reached this point, will be firmly maintained there through the effect of the negative pressure, without this impeding the propulsion of the straw at a linear speed practically equal to the tangential speed measurable at the points of contact (such as m or M in FIG. 5).

Thus, the straw, once it has been picked up from suction slot 120 through the lowering of the pallet 130 (FIG. 4), is immediately "taken aboard" the underlying train of rollers 700 and propelled by it in the direction of the printing station I, hence towards the left in FIG. 2. Reference number 52 designates in this figure the optical monitoring area where the passage of the straw produces a corresponding signal in a sensor which will enable, as we have seen, the triggering of the printing signal sent to printing head 11 via cable 13.

According to one arrangement of the present invention, the printing head 11 is mounted on the transverse panel 140 via a plate 141 secured to one side of the body of the had and bearing a threaded rod 142 adapted to slide in a substantially horizontal slot 143 of panel 140 and to be immobilized at will at the front or at the rear of this slot, in a vertical or horizontal position, at will, by tightening a knurled knob 144.

Thanks to this arrangement, it is possible to place the printing head in a normally vertical working position not only in the printing position shown in solid lines in FIG. 3, but also in a withdrawn position 11A illustrated in dot and dash lines in which the head conveniently clears the front propulsion device to enable the latter to be adjusted or serviced. However, it is possible, in addition, to adopt for the printing head the position indicated by 11B wherein, after 90° rotation about the axis of rod 142, it takes up a horizontal position that is of such a nature as to facilitate considerably the operations of servicing the head itself (cleaning, adjustment, ink replenishment, etc.).

FIGS. 7 and 8 relate to an alternative form of embodiment in which the straws for printing are loaded not by means of a feed hopper but directly by the output of a straw filling apparatus of the type comprising a filling station and a device for welding at least one of the ends of the filled straws. A machine of this type, produced by the company styled the Société Instruments de Médecine Vétérinaire (IMV) under the reference MRS 3 is suitable for processing the straws thus in groups of three and comprises at its output a system of conveyor belts such as schematically illustrated in FIGS. 7 and 8; this system comprises, by way of example, three serrated belts 80 passing over a common idle roller 81. Each straw, such as P, leaving the machine (not shown) arrives maintained between two successive serrations of each of belts 80 and is released when these belts wind around the idle roller 81, this winding causing a relative angular separation in each pair of successive serrations. Each straw thus released is transferred in this way into an admission passage 82 the bottom 83 of which has extensions on either side and between the belts 80. This admission passage can be more or less slightly sloped and ends in any case opposite the suction slot 120 of the distributor previously described, which remains unchanged apart from the removal of loading hopper 50.

As the hourly rate of the distributor according to the present invention is always higher than the throughput of a filling machine of the kind under consideration, for example of the MRS 3 type, there is no risk of congestion at the input. To adapt the distributor to the filling machine, it suffices to align the admission passage 82 suitably with the upper level of the system of output conveyor belts and, more especially, of the terminal idle roller 81 of this system.

We claim:

1. A printing machine for elongate cylindrical articles, including a printing station having a printing head, and handling apparatus for feeding the cylindrical articles to the printing head comprising:
   an admission passage for receiving, guiding and feeding the cylindrical articles;
   a wall, a suction port disposed in the wall at a downstream end of the admission passage and connected to a source of negative pressure such that a leading cylindrical article at the downstream end of said passage is adapted to be drawn to and held at the suction port;
   conveying means disposed in working relationship with said suction port for conveying the cylindrical articles one by one past the printing head; and
   a transfer plunger mounted for reciprocating along said wall between said suction port and the conveying means to transfer the leading cylindrical article from the suction port to the conveying means by displacement of the transfer plunger toward the conveying means;

whereby said conveying means transfers said cylindrical articles to said printing head.

2. The printing machine according to claim 1, further comprising a channel having a diameter greater than that of the cylindrical articles extending between the suction port and the conveying means, said transfer plunger being reciprocally movable in said channel.

3. The printing machine according to claim 1, wherein said conveying means comprises a plurality of parallel groove rollers, and said conveying means has a path of movement passing below the wall and under said printing station.

4. The printing machine according to claim 3, further comprising a housing accomodating said conveying means, said housing being in communication with a source of negative pressure so as to apply suction to the groove of said plurality of rollers and hold said cylindrical articles in position on said conveying means during displacement thereof.

5. The printing machine according to claim 1, further comprising a loading hopper for cylindrical articles arranged upstream of the admission passage, the loading hopper being disposed above the admission passage.

6. The printing machine according to claim 1, wherein said conveying means comprises a plurality of groove rollers each having an outer periphery and having obliquely inclined walls or flanks adjacent the periphery of the respective rollers for seating cylindrical articles of different diameters.

7. The printing machine according to claim 1, wherein said transfer plunger has an endwall cooperable with the leading cylindrical article in position at the suction port, said transfer plunger having an oblique face directed from said endwall away from said conveyor means and generally upstream relative to the advance of cylindrical articles towards the suction port.

8. The printing machine according to claim 1, wherein the displacement of the transfer plunger is substantially vertical downwardly for transfer of the cylindrical articles to the conveying means, and said conveying means has a substantially horizontal path of movement in line with the path of displacement of the transfer plunger.

9. The printing machine according to claim 1, wherein said suction port is disposed above a portion of said conveying means to which the leading cylindrical article is transferred, said transfer plunger being downwardly displaceable for transferring the leading cylindrical article from the suction port to the conveying means.

10. The printing machine according to claim 1, wherein said suction means is spaced a distance apart and is disposed in working relationship and downstream of said admission passage, the distance between the downstream end of the admission passage and the suction port being greater than the diameter of the cylindrical article.

11. An ink jet printing machine for elongate cylindrical articles for biological fluids, including an automatic controlled ink jet printing station having a printing head, and handling apparatus for feeding the cylindrical articles to the printing head comprising:

an admission passage for receiving, guiding and feeding the cylindrical articles;

a wall, a suction port disposed in the wall at a downstream end of the admission passage and connected to a source of negative pressure such that a leading cylindrical article at the downstream end of said passage is adapted to be drawn to and held at the suction port;

conveying means disposed in working relationship with said suction port for conveying the cylindrical articles one by one past the printing head; and a transfer plunger mounted for reciprocating along said wall between said suction port and the conveying means;

whereby the leading cylindrical article is transferred from the suction port to the conveying means by displacement of the transfer plunger toward the conveying means.

12. The ink jet printing machine according to claim 11, further comprising a channel having a diameter greater than that of the cylindrical articles extending between the suction port and the conveying means, said transfer plunger being reciprocally movable in said channel.

13. The ink jet printing machine according to claim 11, wherein said conveying means has a path of movement passing below the wall means and under said printing station.

14. The ink jet printing machine according to claim 13, wherein said conveying means comprises a plurality of parallel groove rollers.

15. The ink jet printing machine according to claim 14, further comprising a housing accomodating said conveying means, said housing being in communication with a source of negative pressure so as to apply suction to the groove of said plurality of rollers and hold said cylindrical articles in position on said conveying means during high speed displacement thereof.

16. The ink jet printing machine according to claim 15, further comprising a motor fan unit defining a common source of negative pressure for said suction portion and said grooved rollers.

17. The ink jet printing machine according to claim 16, wherein motor means for reciprocating said reciprocating plunger is accomodated in said housing.

18. The ink jet printing machine according to claim 17, wherein said motor means comprises an electromagnet having a vertical axis including an armature coupled to a control arm articulated to the plunger on the side of the wall opposite said electromagnet.

19. The ink jet printing machine according to claim 18, wherein there is a window in said wall, and said control arm extends through said window.

20. The ink jet printing machine according to claim 11, wherein said printing head is carried on a pin adjustably mounted in a slot to position the printing head relative to the conveying means and to rock said printing station in a servicing position.

21. The ink jet printing machine according to claim 11, further comprising a loading hopper for cylindrical articles arranged upstream of the admission passage, the loading hopper being disposed above the admission passage.

22. The ink jet printing machine according to claim 21, a bar code sensing means being disposed on the loading hopper for reading bar coded labels affixed to packets of cylindrical articles.

23. The ink jet printing machine according to claim 11, wherein said admission passage is disposed at the downstream end of a run of a conveyor unit for feeding cylindrical articles into said admission passage one at a time.

24. The ink jet printing machine according to claim 11, wherein said conveyor means comprises a plurality of groove rollers each having an outer periphery and having obliquely inclined walls or flanks adjacent the periphery of the respective rollers for seating cylindrical articles of different diameters.

25. The ink jet printing machine according to claim 11, wherein said transfer plunger has an endwall cooperable with the leading cylindrical article in position at the suction port, said transfer plunger having an oblique face directed from said endwall away from said conveyor means and generally upstream relative to the advance of cylindrical articles towards the suction port.

26. The ink jet printing machine according to claim 11, wherein said suction port comprises a slot.

27. The ink jet printing machine according to claim 11, wherein said transfer plunger is in contact with said wall during the plunger's reciprocating displacement.

28. The ink jet printing machine according to claim 11, wherein the displacement of the transfer plunger is substantially vertical downwardly for transfer of the cylindrical articles to the conveying means, and said conveying means has a substantially horizontal path of movement in line with the path of displacement of the transfer plunger.

29. The ink jet printing machine according to claim 11, wherein about 20,000 cylindrical articles per hour are printed.

30. The ink jet printing machine according to claim 11, wherein said suction port is disposed above a portion of said conveying means to which the leading cylindrical article is transferred, said transfer plunger being downwardly displaceable for transferring the leading cylindrical article from the suction port to the conveying means.

31. The ink jet printing machine according to claim 11, wherein said suction means is disposed in working relationship and downstream of said admission passage, the distance between the downstream end of the admission passage and the suction port being greater than the diameter of the cylindrical article.

32. The ink jet printing machine according to claim 31, wherein said distance spans a channel adapted for the displacement of the leading cylindrical article and the transfer plunger from the suction port towards the conveying means.

* * * * *